T. B. OLIVER.
COMBINATION FARMING IMPLEMENT.
APPLICATION FILED JUNE 2, 1917.
1,269,111.
Patented June 11, 1918.
2 SHEETS—SHEET 2.
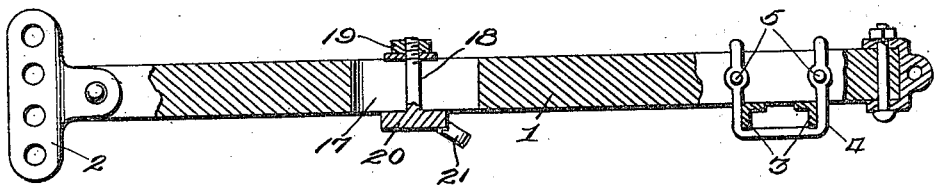
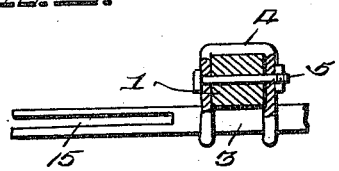
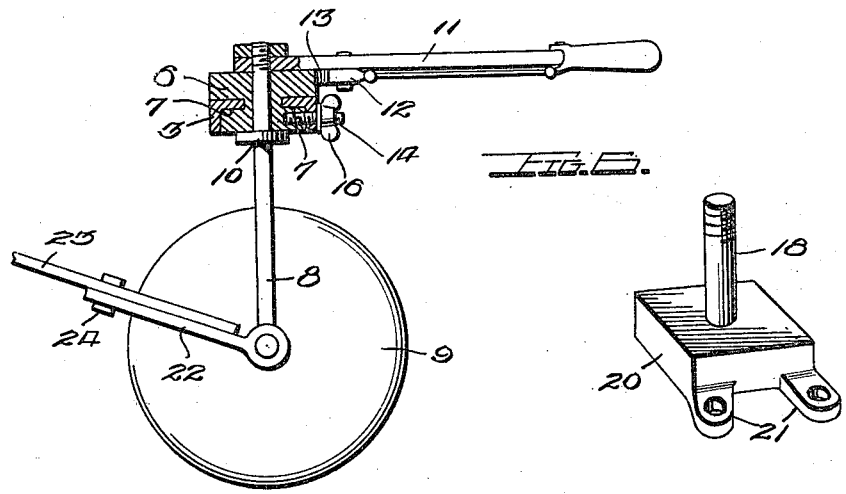
Inventor
T. B. Oliver,
Witnesses
Chas. L. Grieshauer.
A. B. Norton.
By Watson E. Coleman,
Attorney

UNITED STATES PATENT OFFICE.

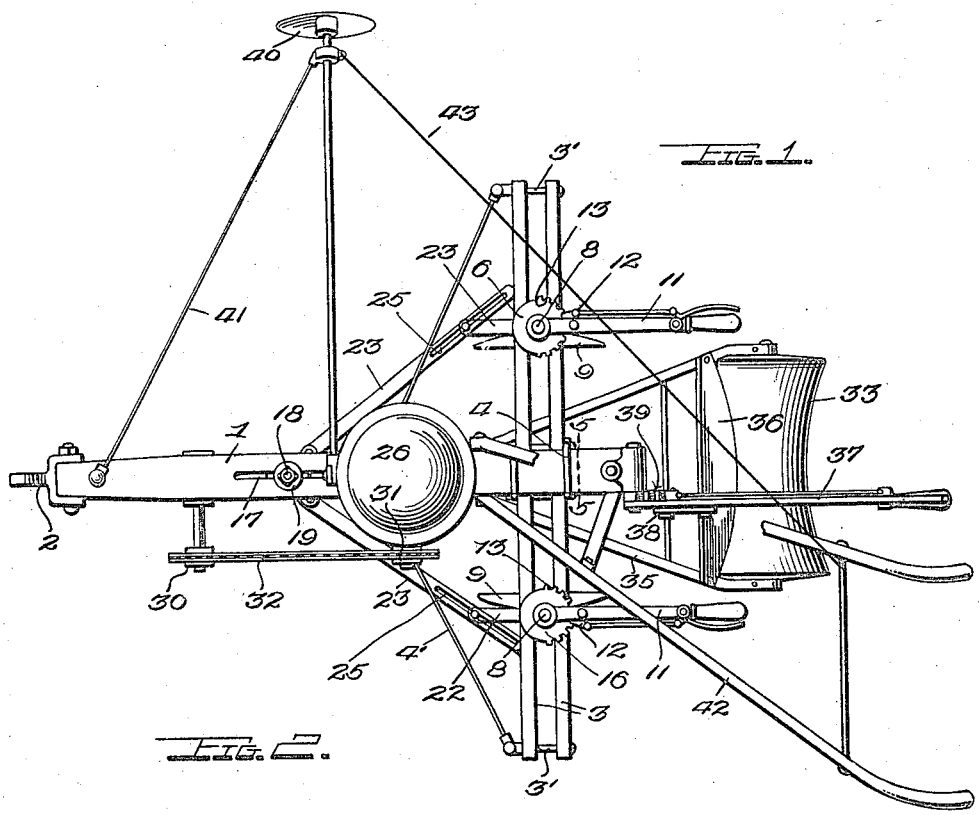

THOMAS B. OLIVER, OF MONTGOMERY COUNTY, TENNESSEE.

COMBINATION FARMING IMPLEMENT.

1,269,111.          Specification of Letters Patent.      Patented June 11, 1918.

Application filed June 2, 1917. Serial No. 172,500.

*To all whom it may concern:*

Be it known that I, THOMAS B. OLIVER, a citizen of the United States, residing in Montgomery county, Tennessee, near Guthrie, in the county of Todd and State of Kentucky, have invented certain new and useful Improvements in Combination Farming Implements, of which the following is a specification, reference being had to the accompanying drawings.

This invention relates to an improvement in farming implements, the primary object thereof being to provide a device of this character with a number of implements which may be used jointly or severally, or which may be used for a double purpose.

A further object of the present invention is to provide a cultivator with a hopper attachment whereby the seed and fertilizer may be dropped within the furrows and having furrow closing disks to follow the hopper and also a land roller for packing the mound after it has been formed by the furrow closing disks.

A still further object of the present invention is to provide a cultivator of this character with a disk mounted thereon which may be adjusted laterally or swung upon their vertical axis, thereby providing disks which may be used for opening the furrows before planting the seeds and may also be used for closing the furrows after the seeds have been planted.

Other objects will appear hereinafter as the description continues.

With the above and other objects in view, this invention consists generally of the beam which is to be carried over the field by a suitable draft attachment and having mounted thereon a fertilizer dropper, a furrow closing disk on the land roller for packing the mound after the furrows have been closed by the said disk.

This invention further consists of the novel details of construction, combination, formation and arrangement of parts as will be hereinafter more fully described, claimed and particularly pointed out in the appended drawings, in which:—

Figure 1 is a plan view of a cultivator embodying my invention.

Fig. 2 is a side elevation of the same.

Fig. 3 is a longitudinal detail sectional view.

Fig. 4 is a detail sectional view through one of the brace rods showing the means of attachment for the furrow closing disk.

Fig. 5 is a detail sectional view taken on the line 5—5 in Fig. 1, and

Fig. 6 is a detail perspective view of the sliding block which connects the brace rod to the main beam.

Referring more particularly to the drawings wherein like parts are illustrated by like reference numerals throughout the several views, the numeral 1 indicates a longitudinally extending horizontal beam having secured to its forward end in any suitable or well known manner a clevis 2 to which a swingle or double-tree may be attached for hitching the draft animals to the cultivator.

Secured to the lower face of the beam adjacent the rear end thereof is a pair of parallel transversely extending angle bars 3 which are secured to the beam 1 by means of U-shaped yokes 4 and held in a spaced relation to form a recess in which is slidably mounted the means for securing the furrow closing disk to the said beams, as will be hereinafter described. The outer extremities of the angle bars 3 are secured by transversely extending bolts 3' which can be readily removed when it is desired to place more disks within the bar when the same is being used as a cultivator for planting corn or the like. The outer extremities of the transversely extending bars 3 are connected to the beam 1 by means of brace rods 4'. These yokes 4 are secured upon each side of the beam 1 by means of transversely extending bolts 5.

Slidably mounted within the recess formed by the angular bars 3 are blocks 6 which have recesses 7 formed on the opposite sides thereof for receiving the upper angular portion of the angle bars 3. Mounted within each of these blocks 6 is a vertically extending stem 8 which has mounted in the lower extremity thereof the usual disk 9. Each of these stems 8 is provided with a flange 10 which contacts with the lower face of a block 6 and the upper end thereof has keyed thereto or fixed in any other suitable manner an operating handle 11. It will be seen that by operating this handle 11 the disk 9 may be swung at any angle upon its vertical axis, thereby providing means for making or closing the furrows. To provide means for holding these disks at any angle, I provide upon the operating lever 11 a spring actuated pawl 12 which is adapted to engage the segmental rack 13 formed upon each of the blocks 6.

To provide means for holding these blocks at any desired position with relation to the angular members 3, a threaded stop member 14 is mounted within one side of each of the blocks and operates within a longitudinally extending slot 15 formed within one of the angular members. The outer extremity of this stop 14 is provided with a wing nut 16 which, when adjusted, will hold the block in a rigid position.

Mounted in the beam adjacent the forward end thereof is a longitudinally extending slot 17 having mounted therein a threaded pin 18 which has engaged therewith a nut 19 whereby the said pin may be held at any desired position longitudinally of the slot 17 for a purpose which will be hereinafter described. Formed integral with the lower extremity of this pin 18 is a block 20 having formed on its rear end a pair of apertured ears 21. Formed integral with the lower extremity of each of the stems 8 is a link 22 which is connected to an ear 21 by means of brace rods 23 which will obviously release the stem 8 of any longitudinal strain exerted upon the furrow closing disk 9. These brace rods 23 are pivotally secured to the ears 21 at one extremity and the opposite extremities are connected to the links 22 by means of the pins 24 which operate within slots 25 formed within the brace rods 23 which will obviously permit the disks 9 to be adjusted upon their vertical axes without interfering with the brace rods, or departing from their utility.

Mounted upon the intermediate portion of the beam 1 is a fertilizer holding receptacle 26 which may be mounted upon this beam in any desired manner, which, of course, forms no part of the present invention, and extending from this receptacle 26 is a usual delivering spout 27 which directs the fertilizer within the furrows.

A ground wheel 28 is mounted adjacent the forward end of the beam by suitable brackets 29 for supporting the forward end of the cultivator and has formed on the axle thereof a sprocket wheel 30 which is connected with the sprocket wheel 31 mounted upon the fertilizer receptacle by means of a sprocket chain 32 whereby the delivery of the fertilizer may be regulated at certain intervals in any preferred or desired manner as is common with fertilizer distributers.

After the furrow has been closed by means of the disk and the mound made, I provide a land roller upon the rearward portion of the cultivator which will pack the mound as made for obvious reasons. This land roller comprises a concave roller 33 which is pivotally connected to the beam 1, as at 34, by means of a bifurcated rod 25. This roller is also provided with a scraper 36 which engages the periphery of the roller for scraping the dirt from the same when traveling over the ground.

To provide means for raising and lowering this land roller and holding the same in a desired position, I provide a hand lever 37 which is pivotally mounted upon the rear extremity of the beam 1 and is connected to the bar 35 by means of a link 38. A segmental gear 39 is mounted upon the beam 1 and the operating lever 37 is provided with a spring pressed pawl adapted to engage the rack whereby the lever will raise and lower the land roller and the spring actuated pawl will hold the lever at the desired position thereby holding the land roller at any desired height.

Pivotally mounted upon the forward end of the beam 1 and extending laterally therefrom is a land marker 40 and is braced to the forward end of the beam 1 by means of a brace rod 41.

Secured to each side of the beam 1 and extending rearwardly and diagonally therefrom is a pair of handles 42 which extend to one side of the cultivator to keep the operator from walking upon the furrow after the same has been formed. A rope or cable 43 connects the transverse brace rod of the handles with the outer end of the land marker whereby the operator may raise and lower the same at will.

It is apparent from the foregoing description taken in connection with the accompanying drawings that other minor details of construction, changes as to form and operation, may be resorted to that come within the scope of the appended claims without departing from the spirit thereof.

Having thus fully described my invention, what I claim as new and desire to secure by Letters Patent, is:—

1. In a cultivator, the combination of a beam, a guideway disposed transversely relative to the beam, a block slidably engaged within the guideway, a stem rotatably engaged within the block, means for holding supported by the block, means for holding the stem against rotation, a ground working member supported by the stem, a link engaged with the stem adjacent the ground working member, and a bracing rod, one end portion of the rod having adjustable connection with the beam in a direction longitudinally of the beam and the opposite end portion of the rod having adjustable connection with the link.

2. In a cultivator, the combination of a beam, a guideway disposed transversely relative to the beam, a block slidably engaged within the guideway, a stem rotatably supported by the block, means for holding the stem against rotation, a ground working member supported by the stem, a link engaged with the stem adjacent the ground working member, and a bracing rod, one end portion of the rod having adjustable connection with the beam in a direction longitudinally of the beam, and the opposite end portion of the rod being provided with a slot, the slotted portion of the rod overlapping the link and a pin carried by the link and extending through the slot of the rod.

In testimony whereof I hereunto affix my signature in the presence of two witnesses.

THOMAS B. OLIVER.

Witnesses:
H. E. DOWLEN,
H. S. SHAW.